(12) United States Patent  
Ayotte

(10) Patent No.: US 10,135,285 B2
(45) Date of Patent: Nov. 20, 2018

(54) WIRELESS POWER FOR VEHICULAR PASSENGER SEATS

(71) Applicant: THE BOEING COMPANY, Chicago, IL (US)

(72) Inventor: Loren Thomas Ayotte, Everett, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 14/954,017

(22) Filed: Nov. 30, 2015

(65) Prior Publication Data

US 2017/0155268 A1    Jun. 1, 2017

(51) Int. Cl.
H02J 7/00       (2006.01)
H02J 7/02       (2016.01)
H02J 50/10      (2016.01)

(52) U.S. Cl.
CPC ............ H02J 7/025 (2013.01); H02J 7/0013 (2013.01); H02J 7/0042 (2013.01); H02J 50/10 (2016.02)

(58) Field of Classification Search
CPC ........ H02J 7/025; H02J 7/0013; H02J 7/0042; H02J 7/04; B60L 1/00
See application file for complete search history.

(56) References Cited

U.S. PATENT DOCUMENTS

| 7,741,734 | B2 | 6/2010 | Joannopoulos et al. |
| 7,825,543 | B2 | 11/2010 | Karalis et al. |
| 8,035,255 | B2 | 10/2011 | Kurs et al. |
| 8,816,633 | B1 | 8/2014 | Neal et al. |
| 8,946,938 | B2 | 2/2015 | Kesler et al. |
| 8,957,548 | B2 | 2/2015 | Fuchs |
| 8,963,488 | B2 | 2/2015 | Campanella et al. |
| 2009/0072796 | A1* | 3/2009 | Wang .................... H02J 7/0052 320/164 |

(Continued)

OTHER PUBLICATIONS

Alliance for Wireless Power: An overview of Market Outlook, Technology Direction and Membership Benefits (2012); from http://www.rezence.com/sites/default/files/Business%20White%20Paper%20-%20A4WP.pdf; 2012.

(Continued)

Primary Examiner — Nha Nguyen
(74) Attorney, Agent, or Firm — Coats & Bennett, PLLC

(57) ABSTRACT

An electrical system for low-power charging of personal electronic devices is made available at each passenger seat in a vehicle using wireless power technology. Alternating current is delivered by conductors behind the sidewall panels or under the floor of the vehicle body to the passenger area. Electrical power is transferred from these conductors using transmit coils attached outboard of the sidewall panels or below the floor to receive coils attached to passenger seats near the transmit coils. The electrical current induced in the receive coils is made available via electrical power charging circuits at a convenient location for each seat via conventional charging ports. Transmit and receive coils are designed and configured to permit different seating configurations without the need for rewiring by placement and design of larger transmit and receive coils or by using track-mounted transmit and receive coils or a combination of these.

18 Claims, 7 Drawing Sheets

(56) References Cited

U.S. PATENT DOCUMENTS

| | | | |
|---|---|---|---|
| 2009/0256378 A1* | 10/2009 | Hibi | B60N 2/06 296/65.01 |
| 2013/0221744 A1* | 8/2013 | Hall | H02J 17/00 307/9.1 |
| 2014/0183910 A1 | 7/2014 | Ulbrich-Gasparevic et al. | |
| 2014/0252813 A1* | 9/2014 | Lee | H02J 17/00 297/180.12 |
| 2015/0091389 A1* | 4/2015 | Byrne | H02J 5/005 307/104 |

OTHER PUBLICATIONS

Tseng, R., B. Von Novak, S. Shevde and K.A. Grajski QUALCOMM, San Diego, CA, USA; Slide presentation entitled: Introduction to the Alliance for Wireless Power (A4WP) Loosely-Coupled WPT Specification 1.0; found at https://www.rezence.com/sites/default/files/IEEE%20WPTC%202013%20A4WP%20Intro%20Keynote%20(FINAL%2013May2013).pdf ; from Alliance for Wire Power, San Diego, CA; May 15, 2013.

Webpage Intellectual Property: WiTricity Corporation; from http://witricity.com/technology/intellectual-property/.; pp. 1-18; Nov. 23, 2015.

* cited by examiner

WIRELESS POWER FOR VEHICULAR PASSENGER SEATS

TECHNOLOGICAL FIELD

The present disclosure relates generally to the field of wireless electrical power. More specifically, the present disclosure relates to providing wireless electrical power to passenger seats in vehicles.

BACKGROUND

Wireless technology involves using a first electrical current in a first conductor to generate a magnetic field that is then used in turn by a second conductor to generate a second electrical current. Coils are used to more efficiently couple the first conductor to the second conductor. A transmit coil on the end of the first conductor and a receive coil on the end of the second conductor can be designed and positioned to transfer power efficiently. The receive coil can be connected electrically to an electrical charging device.

Transferring electrical power wirelessly is known. Using wireless power transfer to charge or recharge portable electronic devices is also known. The elimination of the direct physical connection obtained in wireless power transfer avoids the problem of plug-socket incompatibility. It also reduces the need for the receive coil to be in a precise location.

Transferring power for charging devices and other purposes and has been extensively studied. See, for example, U.S. Pat. No. 8,963,488, U.S. Pat. No. 8,957,548, U.S. Pat. No. 8,946,938, U.S. Pat. No. 8,816,633, U.S. Pat. No. 8,035,255, U.S. Pat. No. 7,825,543 and U.S. Pat. No. 7,741,734, all of which are incorporated herein in their entirety by reference.

Providing electrical power to operate and charge personal electronic devices, such as cell phones, pad-type computers, tablet computers, and gaming devices in a vehicle poses additional challenges. Wireless power operates most effectively at close range so there is still a requirements for wiring to deliver electrical current and for the transmit coil to be close to the receive coil. Consequently, it may be simpler to wire a vehicle for charging electrical outlets during its manufacture. In buses and passenger aircraft, where there are typically many seats, the requirements for wiring each seat are multiplied to the point where the cost of the wire and the labor to install it and even the weight of the wiring becomes an issue.

Moreover, seating in vehicles may be reconfigured after its initial configuration. Replacing seats in first class of an aircraft with more coach seating or adding or removing a row of seats and adjusting the remaining seat row accordingly alters the seat pitch, that is, the distance between rows. Allowing for reconfiguration of seating in a hard-wired or wireless power mode in such a vehicle is much more complicated than in a fixed-seat vehicle.

A system for providing electrical charging power to each passenger seat of a vehicle that overcomes these issues would be of advantage.

BRIEF SUMMARY

The present disclosure describes an electrical system for low-power wireless charging that is available at each passenger seat in a vehicle. Electrical current is delivered by conductors located behind the sidewall panel or under the floor of the vehicle body along the sides of the passenger area. Power is transferred from those conductors by transmit coils carried by the sidewall panel or by the floor to receive coils located between the seat and the wall panel or floor and then made available to a convenient location at each seat for use by passengers, such as through conventional uniform serial bus (USB) ports. Transmit and receive coils are designed, located, and configured to permit changes in the seating configuration without rewiring.

By building in flexibility in the locations of the transmit and receive coils that complements the spatial flexibility inherent in wireless power transfer, the goal of electrical charging power for each seat in a reconfigurable vehicle is met. Flexibility is provided by coil geometric design, number, location, and by movable transmit and receive coils, or a combination of these.

According to an aspect of the disclosure, a power supply for the vehicle produces an electrical current that is carried into the interior of the vehicle to the passenger seating area using electrical conductors running behind a wall panel or under a floor of the interior where passenger seats are located. Transmit coils are carried by the wall panels or mounted under the floor near the seats. Receive coils are positioned between the transmit coils and the seats so that electrical current may be induced by the transmit coils in the receive coils. The received electrical current is conducted to an electrical power charging outlet located conveniently for each seated passenger where it is made available via standard direct current charging plugs for use in charging and recharging personal electronic devices.

An aspect of the disclosure is that the transmit coil may be located under the floor or behind the wall panel and the receive coil may be located on the floor above the transmit coil, on the opposite side of the wall panel from a transmit coil, or attached to the end seat of a row of seats when the end seat is close enough to the wall panel-mounted transmit coil. The receive coil may alternatively be located under an end seat to be close to a transmit coil mounted under the floor or on a wall panel.

Another aspect of the disclosure is that the transmit coil may be horizontally movable in the event the receive coil is attached to the outboard seat of a row of seats and the seat pitch is shortened or lengthened.

Yet another aspect of the disclosure is that the transmit coil may be designed to be longer in the horizontal direction in the event of a pitch change in a seat having a seat-based receive coil so that the perpendicular spacing between the transmitting and receive coils does not change when the position of the seat is moved forward or backward.

An aspect of the disclosure is that the electrical power line may support plural spaced-apart transmit coils in the event there are plural spaced-apart seats or rows of seats to provide wireless charging power transfer to each seat or row of seats.

An aspect of the disclosure is that the electrical charging circuit may produce, for example, five volts DC for charging power through a standard charging port such as a universal serial bus port.

An aspect of the disclosure is that the vehicle may be an aircraft, an automobile, a bus, a watercraft or a truck having passenger seating.

Another aspect of the disclosure is a method for providing electrical power to a seat in a vehicle by attaching a transmit coil to a wall panel of the vehicle, attaching a receive coil between the transmit coil and a seat in the vehicle, and attaching an electrical power charging circuit to the seat in the vehicle. Then, by energizing the transmit coil with a first electric current from a source of electric current, a second electric current is induced in the receive coil, and the induced electric current is conducted to the electrical power charging circuit for the user to use in charging a personal electronic device.

Yet another aspect of the disclosure is attaching a sladable transmit coil to the wall panel so that, if a receive coil is attached to a seat and the seat is moved, the transmit coil can be moved to the new location of the receive coil without rewiring.

Other aspects of the disclosure will be apparent to those skilled in the art of wireless power from a careful reading of the Detailed Description accompanied by the following drawings.

BRIEF DESCRIPTION OF THE DRAWINGS

Figure 1:
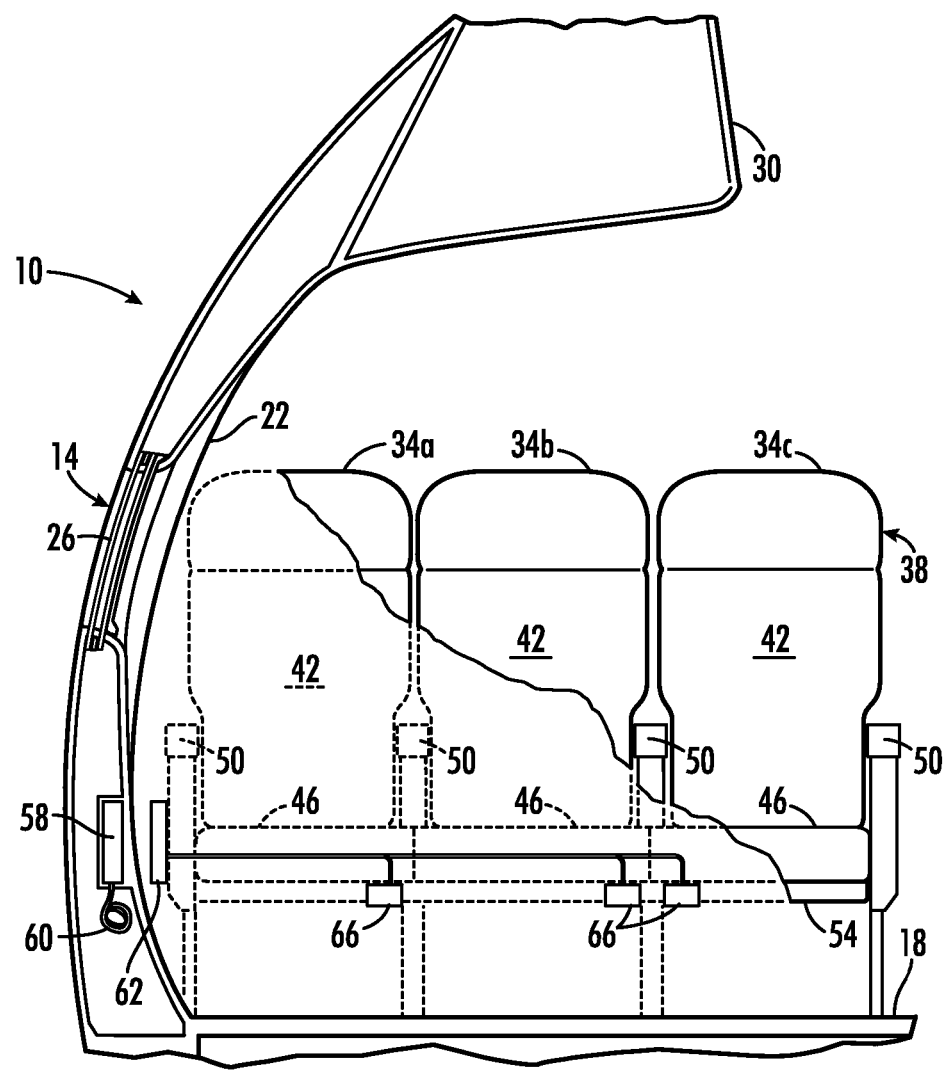
Figure 2:
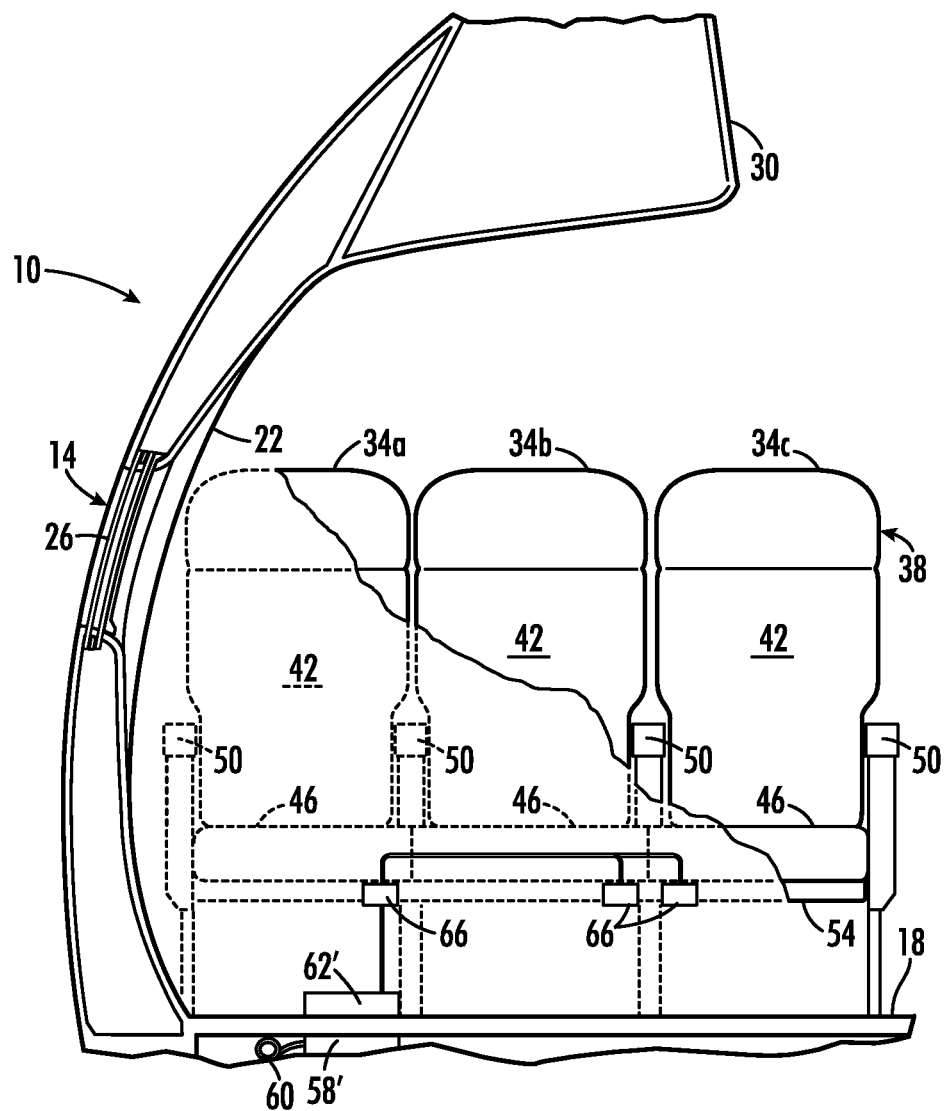
Figure 3:
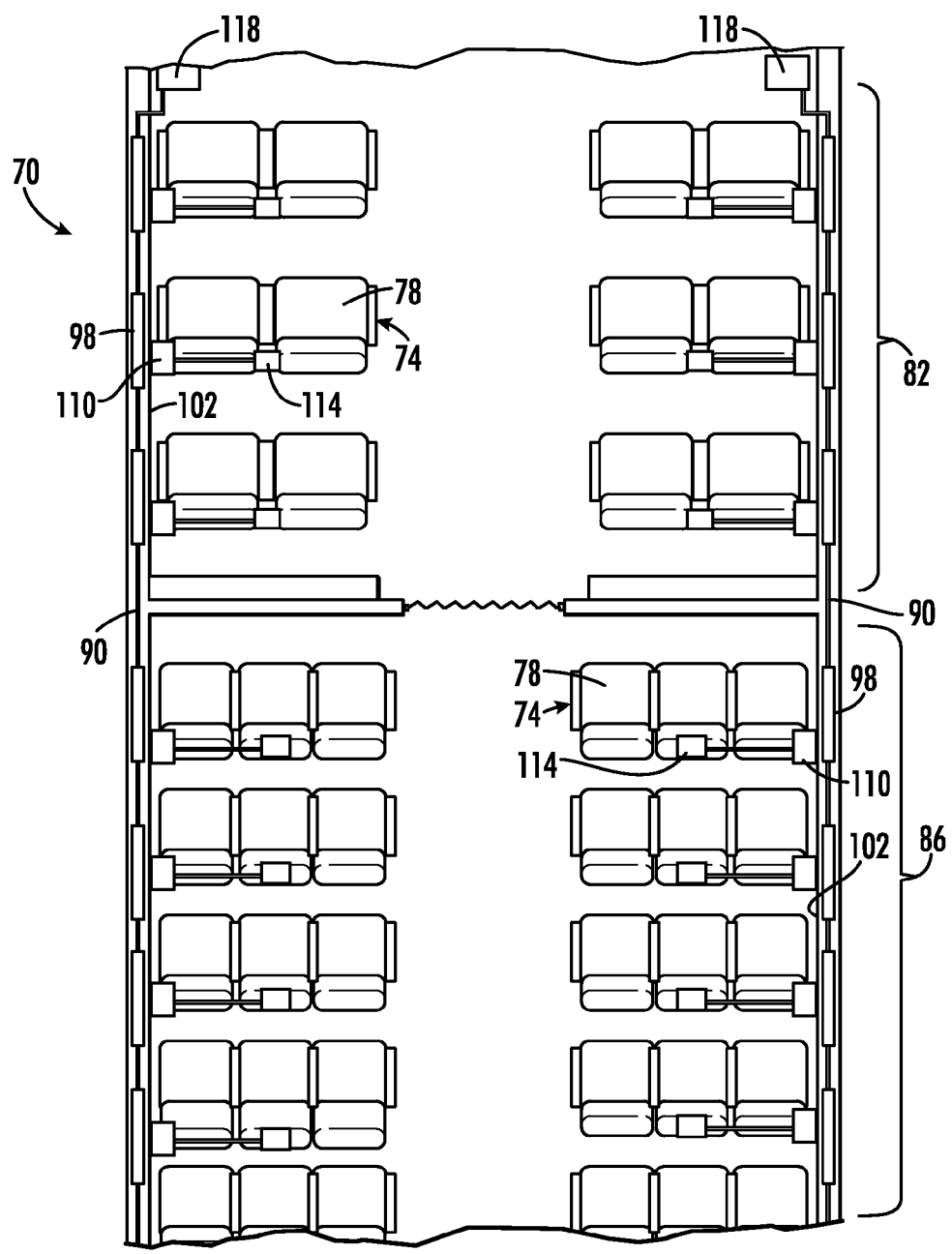
Figure 4A:
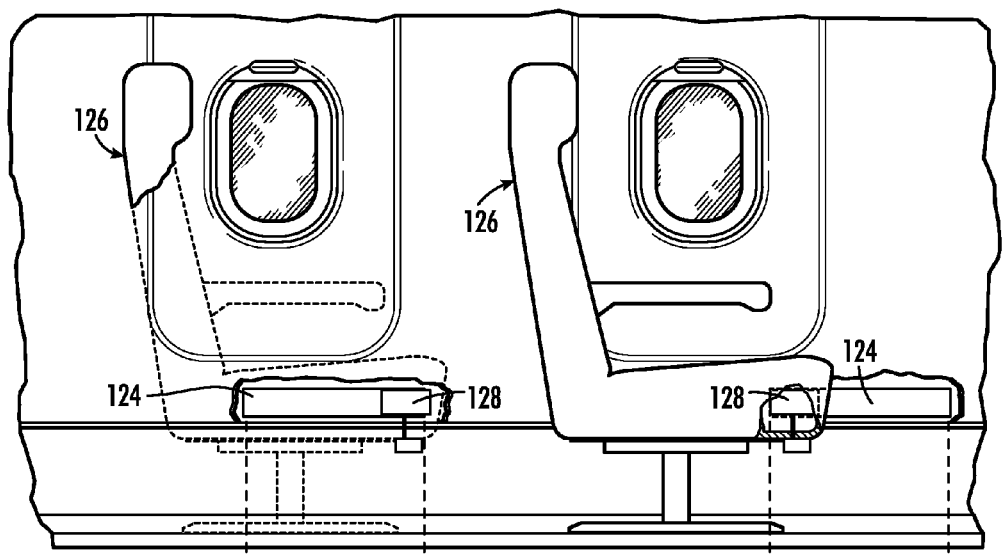
Figure 4B:
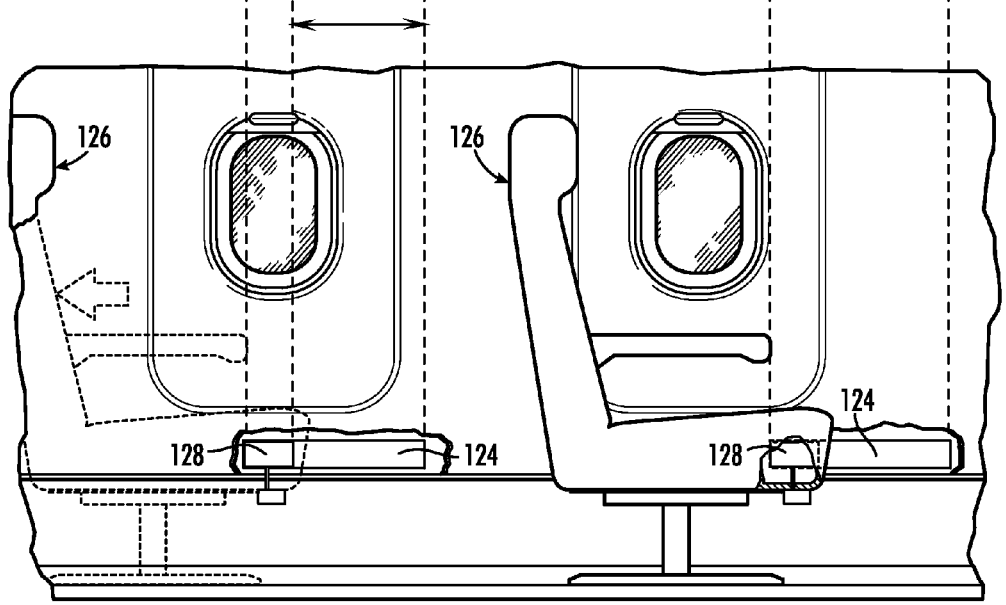
Figure 5A:
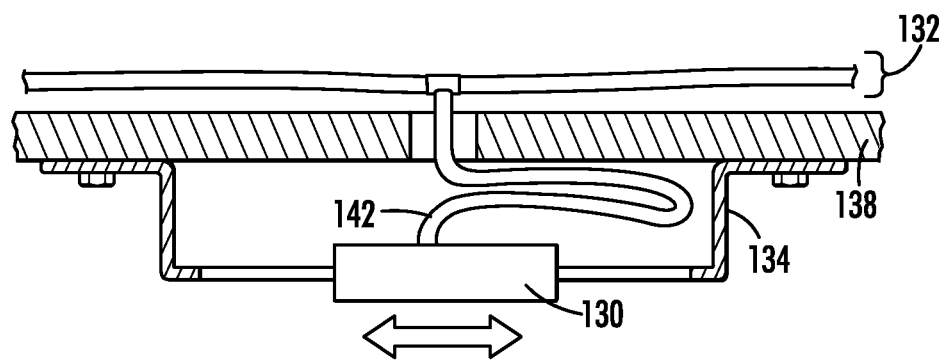
Figure 5B:
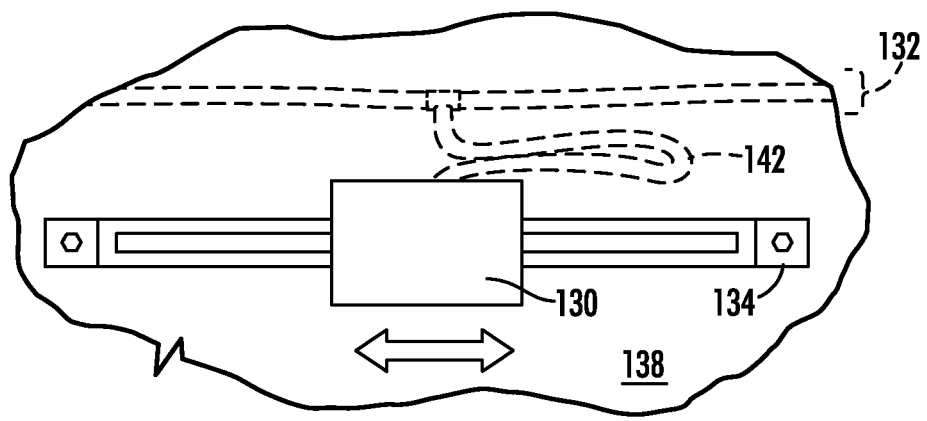
Figure 6A:
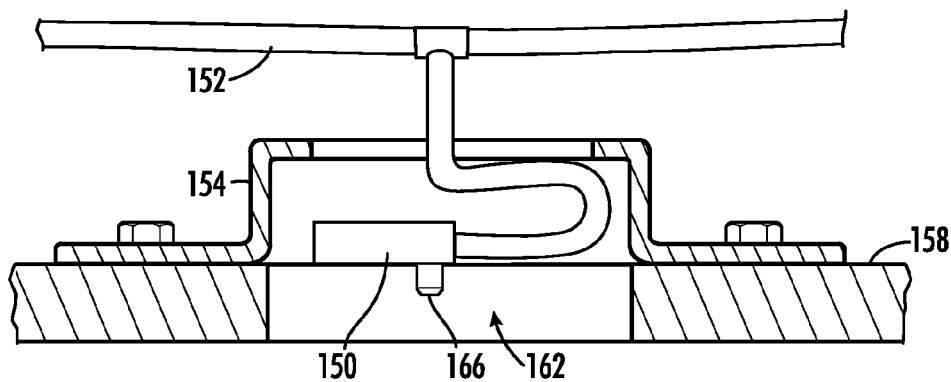
Figure 6B:
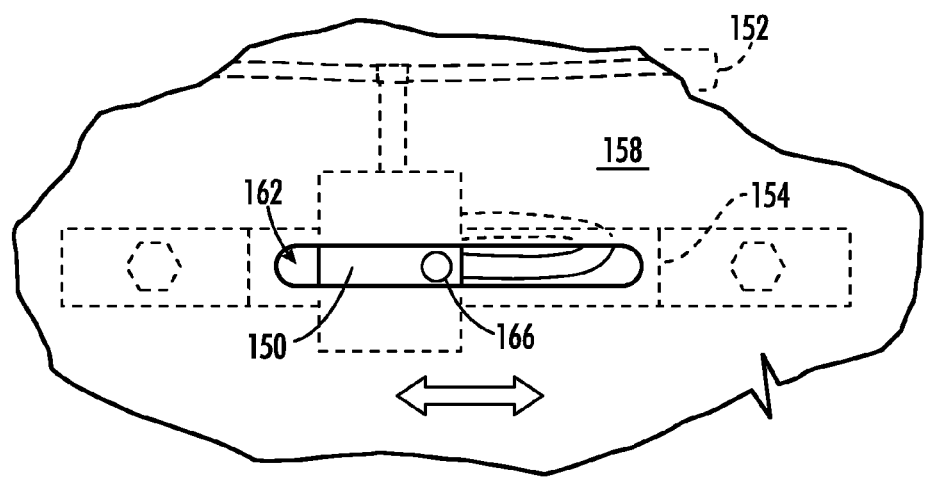
Figure 7A:
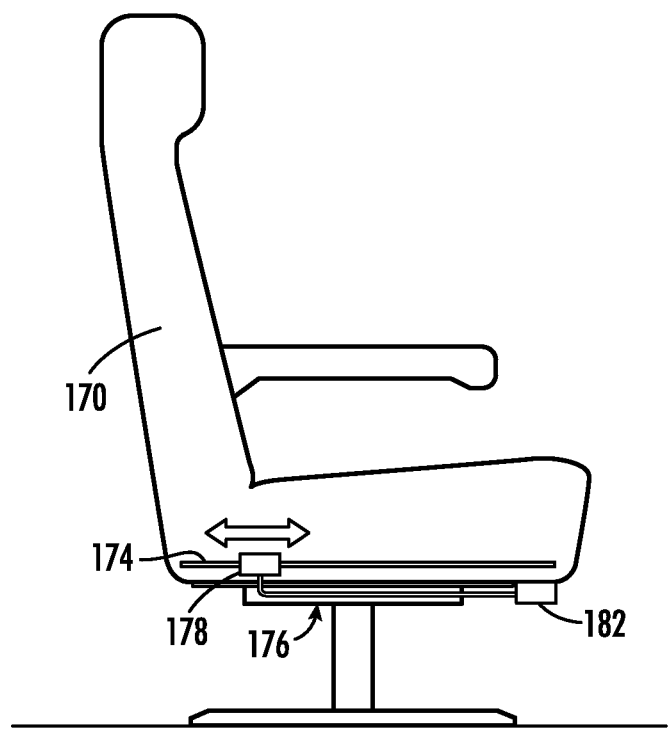
Figure 7B:
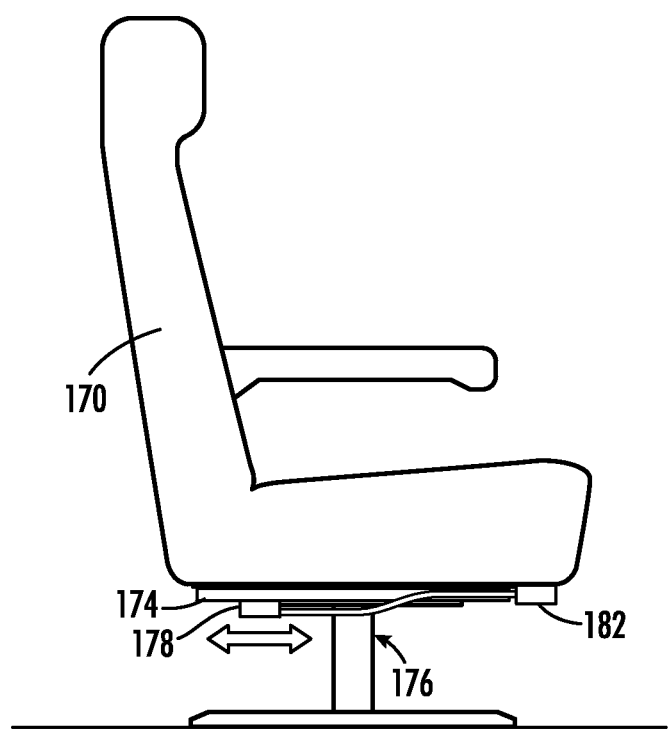

Having thus described variations of the disclosure in general terms, reference will now be made to the accompanying drawings, which are not necessarily drawn to scale, and wherein:

FIG. 1 is a cross-sectional view of a vehicle with a row of seats and a wall-mounted power transfer system, according to an aspect of the disclosure;

FIG. 2 is a cross-sectional view of a vehicle with a row of seats and a floor-mounted power transfer system, according to an aspect of the disclosure;

FIG. 3 is a top, cross-sectional view of a portion of the passenger area of a vehicle with rows of seat having two different seat pitches to show the adjustability of a wall-mounted power transfer system in accommodating the two different seat pitches;

FIGS. 4A and 4B, respectively, are side views of two seats in a passenger vehicle before and after the modification of the seat pitch having long transmit coils that can accommodate the increase in the seat pitch without rewiring, according to an aspect of the disclosure;

FIGS. 5A and 5B show top cross-sectional and side views, respectively, of a wall-mounted transmit coil carried by a track on the inboard side of wall panel to permit horizontal adjustment of the transmit coil, according to an aspect of the disclosure;

FIGS. 6A and 6B show top cross-sectional and side views, respectively, of a wall mounted transmit coil carried in a track on the outboard side of the wall panel to permit horizontal adjustment of the transmit coil, according to an aspect of the disclosure; and FIGS. 7A and 7B show seat side-mounted and seat bottom-mounted tracks, respectively, with movable receive coils according to an aspect of the disclosure.

DETAILED DESCRIPTION

Disclosed herein is a system and method for providing direct current charging power to an electric charging device proximate to the seats of a passenger vehicle. The disclosed system enables vehicular electrical power to be transferred wirelessly to a passenger seat from a transmitting coil behind or on vehicle wall panels or below the vehicle's floor, which thereby reduces wiring requirements and enables seat replacement or reconfiguration without disconnecting and reconnecting wires. Moreover, by design of transmit and receive coils, it allows seats to be located at different pitches, an aspect important in vehicles where seats are configured in different ways across aircraft of the same type or reconfigured in the same aircraft from time to time. A row of seats may contain plural seats that are managed as a unit. One coil can receive power for the row that can then be delivered to a charging port at each of the seats via electrical conductors embedded in the row. Accordingly, the present system and method reduces wiring costs, wiring installation time and costs, and the weight of wiring in providing a recharging capability to passengers.

The term electrical charging device refers a device that has a charging port that receives a plug and delivers via that plug direct current at a voltage suitable for operating or charging a personal electronic device, typically five volts DC. The electrical charging device may receive alternating electrical current and rectify it, and may condition the current so as to provide steady, controlled voltage direct current. The plug, which is a feature of the disclosure, may be, for example, a universal serial bus (USB) plug but may be a different plug configuration.

The term personal electronic device includes consumer products that are battery operated and rechargeable, and include cell phones, pad type computers, palm top computers, gaming devices, and devices for playing music such as MP3 and MP4 format players, as well as subsequently developed portable, personal devices for communication and entertainment.

Referring now to the drawings, FIG. 1 is a cross-sectional view of a vehicle 10, here showing a portion of an aircraft. Vehicle 10 has a body 14 with a floor 18 and a wall panel 22 and may also have a window 26 and an overhead compartment 30 for personal items of passengers. Vehicle 10 may have seats 34A, 34B, 34C, arranged in a row 38, which seats may be fabricated as one unit. Each seat 34 has a back 42, a seat cushion 46, arm rests 50, and a frame 54.

In vehicle 10, as shown in FIG. 1, a transmit coil 58 is attached to the outboard side of wall panel 22 and electrically connected to an electrical conductor 60 carrying electrical current. Attached to the outboard side of seat 34A is a receive coil 62. Receive coil 62 responds to the magnetic field generated by transmit coil 58 by producing an electric current that is electrically conducted to an electric charging device 66 and provided for charging personal electronic devices through a standard charging port (not shown) such as a USB charging port. The power source may be an alternating power source, in which case, it may be rectified before delivery to the charging port. Rectification may take place at the source prior to transmission by the transmit coil 58 or after receipt by the receive coil 62.

In FIG. 2, a different arrangement of a transmit coil 58' and receive coil 62' are shown. Otherwise, vehicle 10 is the same as shown in FIG. 1. In FIG. 2, transmit coil 58' is attached to the underside of floor 18 and receive coil is located on floor 18 but may be attached to seat frame 54. Transmit coil 58' and receive coil 62' need to be close enough to transfer power, and the spacing and intervening materials must be such that the magnetic field formed by transmit coil 58' and that is inducing an electric current in receive coil 62' is adequate for charging personal electronic devices. Designing transmit and receive coils is well known and well understood by those skilled in the art of wireless power transfer, and charging systems exist for recharging objects ranging from personal electronic devices to electric cars.

Receive coil 62, 62' may be attached to row 38 so that moving and removing row 38 moves and removes coil 62, 62' and therefore simplifies reconfiguration of vehicle 10.

FIG. 3 shows a top view of a portion of vehicle 70 showing two groups of rows 74 of seats 78, namely a first group 82 with a wider seat pitch and a second group 86 with a narrower seat pitch. FIGS. 4A and 4B show a pair of seats 78 from the side, one in back of the other in a first pitch (FIG. 4A) and in a second pitch (FIG. 4B). Power cords 90 runs along the two sides of the passenger area of vehicle 70 to deliver a first electric current. A power source 118 with a circuit breaker provides the electric current to power cords 90.

At intervals along power cords 90 are transmit coils 98 on the inside of walls 102. On seats 78 are receive coils 110 that respond to the magnetic fields generated by transmit coils 98, which carry first electrical current, by generating a second electrical current. Second electrical current is received by charging device 114 which is in electrical connection with receive coils 110. Transmit coils 98 are larger than receive coils 110, and in particular have a major dimension parallel to walls 102 that is greater than the dimension of receive coils 110, so there is a range of possible positions for receive coils 110 that will still enable them to be aligned with transmit coils 98, that is, close enough to able to receive transferred power. Therefore, the spacing of rows 74 may be varied without the need to change the locations of transmit coils 98 with respect to receive coils 102 because transmit coils 98 are larger.

FIGS. 4A and 4B show the change in pitch possible without a change in wiring or placement of transmit or receive coils 124, 128, respectively, because the transmit coil 124 is larger than receive coil 128. FIG. 4A shows seat row 126 with a first, smaller pitch and FIG. 4B shows seat row 126 with a second, larger pitch, achieved by moving the left row 126 rearward. Despite the increase in pitch, receive coil 128 in row 126 remains aligned with transmit coil 124 in both front and back rows 126 in both FIGS. 4A and 4B because transmit coil 124 is designed to be larger so receive coil 128 remains close enough transmit coil 124 for the second current to be induced in receive coil 128 from the first current in transmit coil 124.

Alternatively, receive coil 128 may be larger than transmit coil 124 or both transmit 124 and receive coils 128 may be made wide for greater flexibility in selecting the pitch of rows 126 while still having transmit and receive coils 124, 128 overlap. In addition, more transmit coils 124 could be provided than receive coils 128 for an additional source of flexibility in pitch selection.

In FIGS. 5A and 5B, there is illustrated a top, cross-sectional view of a movable wall panel-mounted transmit coil 130 attached to an electrical conductor 132. Transmit coil 130 is slidably attached to a track 134 that is mounted to the exterior of a wall panel 138. Transmit coil 130 is able to slide horizontally to provide flexibility in moving it closer to a receive coil (not shown in FIG. 5A or 5B). To facilitate horizontal movement, slack is provided in wires 142 inside track 134, which wires 142 run to an electrical conductor 132. A locking mechanism may be provided to prevent unauthorized movement of the transmit coil 130.

In FIGS. 6A and 6B, a transmit coil 150 is connected to an electrical conductor 152 and is shown slidably attached to a track 154 that is in turn attached to the outboard side of a wall panel 158 but which is accessible through a slit 162 in panel 158. A peg 166 is attached to transmit coil 150 and that extends through slit 162 or mat be accessed through 162 using a tool, such as an Allen wrench (not shown) to adjust the horizontal position of transmit coil 150. This embodiment allows transmit coil 150, positioned on the outboard side of panel 158, to be accessed by technicians from inside the cabin.

FIGS. 7A and 7B illustrate passenger seat 170 with a track 174 attached to the outboard side of seat 170 in FIG. 7A and to the outboard side of frame 176 under seat 170 in FIG. 7B. Seat 170 carries a receive coil 178 mounted to track 174 so that it may be slid horizontally to align receive coil 174 with the nearest transmit coil (not shown). Receive coil 178 is wired to an electronic charging device 182. In a similar manner, receive coil 178 may alternatively be placed in a floor-mounted track 174. Receive coil 178 may be locked once in position or otherwise secured to prevent tampering.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. A vehicle, comprising:
a vehicle having a body defining an interior;
a power supply carried by said vehicle and producing an electric current;
a first conductor connected to said power supply and carried by said body;
a seat positioned in said body;
a transmit coil in electrical connection with said first conductor and receiving said first electric current, said transmit coil producing a magnetic field in response to said electrical current from said power supply carried by said first conductor;
a receive coil in said interior of said body, said receive coil carried by said seat, said receive coil responsive to said magnetic field produced by said transmit coil and producing a second electrical current related to said first electrical current;
an electrical power charging circuit in electrical connection with said receive coil and carried by said seat, said electrical power charging circuit providing a charging electrical current from said second electrical current; and
a charging port;
wherein, when said receive coil is arranged in a plane substantially parallel to a plane of said transmit coil, either said transmit coil is longer in a horizontal direction than said receive coil, or one of the transmit and receive coils are slideably mounted in a horizontal direction, such that after said seat is moved forward or backward within the interior of said vehicle, the receive coil remains within said magnetic field produced by said transmit coil.

2. The vehicle as recited in claim 1, wherein said body includes a floor, and wherein said transmit coil is attached to said floor under said seat.

3. The vehicle as directed in claim 2, wherein said seat has a bottom and wherein said receive coil is attached to said bottom of said seat.

4. The vehicle as recited in claim 1, wherein said body includes a wall panel and said seat has a side, and wherein said transmit coil is attached to said wall panel between said body and said wall panel and said receive coil is located between said wall panel and said side of said seat.

5. The vehicle as recited in claim 1, wherein said seat has a side and said receive coil is attached to said side of said seat.

6. The vehicle as recited in claim 1, wherein said electrical power charging circuit produces low voltage direct current.

7. The vehicle as recited in claim 1, wherein said electrical power charging circuit includes a charging port for receiving a charging plug.

8. The vehicle as recited in claim 7, wherein said charging port is a universal serial bus port.

9. The vehicle as recited in claim 1, wherein said vehicle is an aircraft, an automobile, a truck, a bus, or a watercraft.

10. An aircraft, comprising:
a body defining an interior;
a power supply producing a first electrical current;
at least one electrical conductor connected to said power supply and carried by said body;
a plurality of rows of seats positioned in said interior of said body, a row of seats of said plurality of rows of seats including a plurality of seats;
a plurality of transmit coils in electrical connection with said at least one electrical conductor, a transmit coil of said plurality of transmit coils producing a magnetic field in response to said first electrical current;
a plurality of receive coils in said interior of said body, a receive coil of said plurality of receive coils attached to a row of said plurality of rows of seats, said receive coil being responsive to said magnetic field produced by said transmit coil and producing a second electrical current related to said first electrical current;
a plurality of electrical power charging circuits, an electrical power charging circuit of said plurality of electrical power charging circuits being in electrical connection with said receive coil, said electrical power charging circuit providing a charging electrical current from said second electrical current; and
a plurality of charging ports, a charging port of said plurality of charging ports being in electrical connection with said electrical power charging circuit and carried by a seat of said plurality of seats, wherein said charging electrical current is conducted to said charging port;
wherein, when said receive coil is arranged in a plane substantially parallel to a plane of said transmit coil, either said transmit coil producing a magnetic field is longer in a horizontal direction than said receive coil producing a second electrical current, or one of the transmit coil producing a magnetic field and receive coil producing a second electrical current are slideably mounted in a horizontal direction, such that after said row to which said receive coil producing a second electrical current is moved forward or backward within the interior of said vehicle, the receive coil producing a second electrical current remains within said magnetic field produced by said transmit coil.

11. The aircraft as recited in claim 10, wherein said body includes a floor, and wherein said transmit coil is attached to said floor.

12. The aircraft as recited in claim 10, wherein said seat of said plurality of seats has a bottom and wherein said receive coil is attached to said bottom of said seat.

13. The aircraft as recited in claim 10, wherein said body includes at least one wall panel and said seat has a side, and wherein said transmit coil is attached to a wall panel of said at least one wall panel and said receive coil is attached to said side of said seat.

14. The aircraft as recited in claim 10, wherein said transmit coil is movably attached to said body so that said transmit coil may move between a first position and a second position.

15. The aircraft as recited in claim 10, wherein said seat has a side and said receive coil is attached to said side of said seat.

16. The aircraft as recited in claim 10, wherein said transmit coil has an area and said receive coil has an area and said area of said receive coil is less than said area of said transmit coil.

17. A method for providing electrical power to a seat in a vehicle, said method comprising the steps of:
attaching a transmit coil to a wall panel of a vehicle;
attaching a receive coil between said transmit coil and a seat in said vehicle, whereby a plane of said receive coil is substantially parallel to a plane of said transmit coil said;
attaching an electrical power charging circuit to said seat in said vehicle, said electrical power charging circuit being in electrical connection with said receive coil and a charging port;
energizing said transmit coil with a first electrical current from a source of electrical current thereby inducing a second electrical current in said receive coil, and providing said second electrical current to said electrical power charging circuit and said port;
moving said seat forward or backward within the interior of said vehicle; and
if said transmit coil is not sufficiently longer in a horizontal direction than said receive coil, sliding one of said transmit or receive coil in a horizontal direction so as to position said receive coil within a magnetic field produced by said transmit coil.

18. The method of claim 17, wherein said vehicle has a body and said wall panel and a floor are in said body, said panel and said floor defining an interior of said body, and wherein said transmit coil is not in said interior but is accessible from said interior.

* * * * *